(12) United States Patent
Peinelt et al.

(10) Patent No.: US 9,168,794 B2
(45) Date of Patent: Oct. 27, 2015

(54) TESTING DEVICE FOR A TIRE INFLATION DEVICE

(71) Applicant: Schenck RoTec GmbH, Darmstadt (DE)

(72) Inventors: Andreas Peinelt, Pfungstadt (DE); Martin Rogalla, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 109 days.

(21) Appl. No.: 14/191,908

(22) Filed: Feb. 27, 2014

(65) Prior Publication Data
US 2015/0059462 A1    Mar. 5, 2015

(30) Foreign Application Priority Data

Sep. 2, 2013  (DE) .......................... 10 2013 109 563

(51) Int. Cl.
| | |
|---|---|
| *B60C 23/02* | (2006.01) |
| *B60C 23/04* | (2006.01) |
| *G01M 17/02* | (2006.01) |
| *G01L 17/00* | (2006.01) |
| *G01L 27/00* | (2006.01) |

(52) U.S. Cl.
CPC ................. *B60C 23/04* (2013.01); *G01L 17/00* (2013.01); *G01L 27/007* (2013.01); *G01M 17/02* (2013.01)

(58) Field of Classification Search
CPC .. B60C 23/0496; B60C 23/061; G01L 17/00; G01M 17/022
USPC .................... 73/146.8, 146.3, 146.2, 146, 700
See application file for complete search history.

(56) References Cited

U.S. PATENT DOCUMENTS

| | | | | |
|---|---|---|---|---|
| 6,467,524 B2 * | 10/2002 | Ronge et al. | ................... | 157/1.17 |
| 7,506,671 B2 * | 3/2009 | Peinelt et al. | .................... | 141/38 |
| 7,971,621 B2 * | 7/2011 | Rogalla et al. | ............... | 157/1.17 |
| 2004/0011117 A1 * | 1/2004 | Dutt et al. | .......................... | 73/48 |

FOREIGN PATENT DOCUMENTS

| | | | |
|---|---|---|---|
| EP | 1 125 772 B1 | 8/2001 | |
| EP | 1 671 820 B1 | 6/2006 | |

OTHER PUBLICATIONS

International Search Report in PCT Application No. PCT/EP2014/072849, mailed Jul. 2, 2015, with English translation of the relevant parts.

\* cited by examiner

*Primary Examiner* — Lisa Caputo
*Assistant Examiner* — Nigel Plumb
(74) *Attorney, Agent, or Firm* — Collard & Roe, P.C.

(57) ABSTRACT

Disclosed is a testing device for a tire inflation device, comprising a housing (10) which includes a bottom (11) and an annular outer wall (12) with a cylindrical inner surface (16), a piston (15) which is movably guided on the cylindrical inner surface (16), is sealed and has an annular engagement surface (20) for sealingly engaging an inflation ring (3) and a central piston opening (19), a spring (26) arranged between the bottom (11) and the piston (15), its spring force seeking to move the piston (15) away from the bottom, and sensors detecting the pressure in an inner chamber (18) adapted to be filled with compressed gas and the temperature of the housing (10).

10 Claims, 1 Drawing Sheet

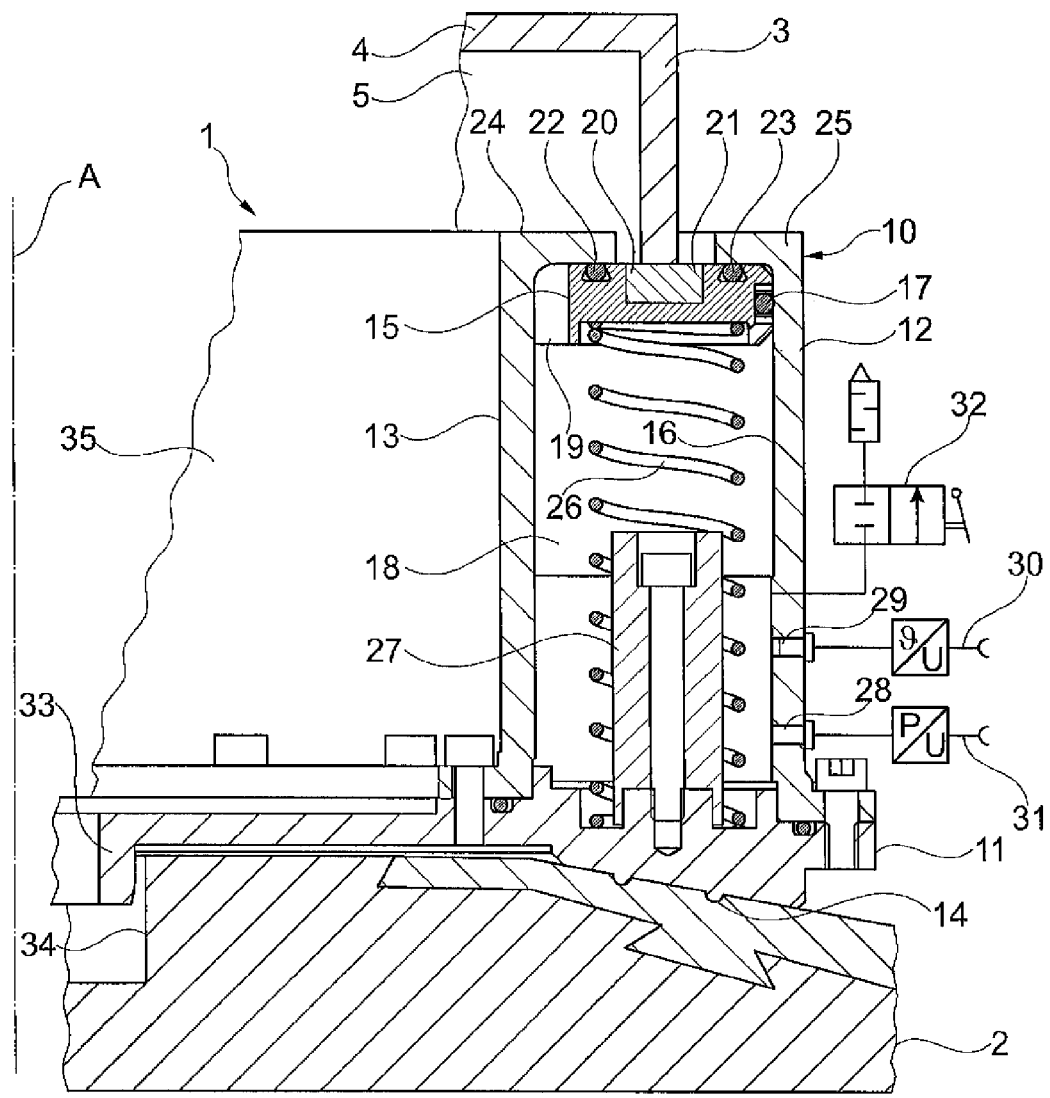

TESTING DEVICE FOR A TIRE INFLATION DEVICE

CROSS REFERENCE TO RELATED APPLICATIONS

Applicant claims priority under 35 U.S.C. §119 of German Application No. 10 2013 109 563.1 filed on Sep. 2, 2013, the disclosure of which is incorporated by reference.

FIELD OF THE INVENTION

This invention relates to a testing device for a tire inflation device having an inflation ring which is engageable against a sidewall of a tire and has an annular opening through which gas under pressure can be fed to the tire, and a sealing device arranged opposite the inflation ring.

BACKGROUND OF THE INVENTION

For inflating tires with compressed air, the automatic series production of automotive vehicle wheels with tubeless tires uses automatic tire inflation devices of the type known from U.S. Pat. Nos. 6,467,524 B2 and 7,506,671 B2 which are integrated into the assembly line. In such devices, the wheel rim with the fitted tire is placed on a suitable sealing device which seals the wheel in downward direction. Positioned on the tire upper side is an inflation bell having an inflation ring which seals the tire and the rim in upward direction. During inflation, the tire sidewall is urged downwardly by lowering the inflation bell with the inflation ring by a distance causing an annular gap to be produced between the tire bead and the rim through which the compressed air fed into the inflation bell is allowed to enter the tire. When the inflation pressure is reached, the inflation bell is raised, causing the tire sidewalls to move apart in axial direction and the tire beads to occupy their respective seats on the wheel rim.

The tire inflation process described is subject to a variety of influences on which the inflation pressure of the tire depends. Influencing factors include manufacturing-induced dimensional allowances for tire and rim, the tire and rim temperatures, and the soaping condition determining the gliding properties of the tire beads. Rims and tires are also mounted in pairs in a variety of combinations. The tire inflation process and hence the tire pressure may also be dependent on this. In addition to these workpiece-related influences, the inflation pressure of the tires is also determined by influences dictated by the tire inflation device and its control. In practice, however, it is possible only with difficulty to separate the influences of the tire inflation device from those caused by the workpieces, i.e., the tire and the rim.

SUMMARY OF THE INVENTION

It is therefore an object of the present invention to provide a testing device which enables a repeatable and workpiece-independent check to be made of the mode of operation of a tire inflation device of the type referred to.

According to the present invention, this object is accomplished by a testing device comprising a housing which includes a bottom and an annular outer wall bounding an inflation chamber having a cylindrical inner surface, further comprising a piston which is movably guided on the cylindrical inner surface, is sealed and has on the side facing away from the bottom an annular engagement surface for sealingly engaging the inflation ring and radially within the engagement surface has a piston opening leading into the housing, at least one spring arranged between the bottom of the housing and the piston, its spring force seeking to move the piston away from the bottom, as well as a pressure sensor capable of detecting the pressure in an inner chamber of the housing adapted to be filled with compressed gas and converting the pressure into electrical quantities. A temperature sensor may additionally be arranged on the housing.

Being used in lieu of a wheel, the testing device of the invention may be inserted into a tire inflation device to be checked in such a way that the inflation ring is engageable with the piston and the bottom rests gastight on the sealing device. The tire inflation device may then perform an inflation operation, causing the piston with its engagement surface to be urged against the sealing surface of the inflation ring and to follow the movements of the inflation ring similar to the sidewall of a tire to be inflated. During inflation, it is then possible for the sensors to measure the pressure in the inflation chamber and the temperature of the housing and record the values in dependence upon time. In this manner, it is possible to perform a check on the mode of operation of the tire inflation device independent of the physical influences caused by the tire and the wheel rim.

According to another proposal of the invention, the testing device may include an annular wall which is affixed to the bottom of the housing, has a diameter smaller than the outer wall and extends through the centrally arranged inflation opening of the piston, with the annular wall including at its end remote from the bottom a radially outwardly extending flange forming a first stop for the piston against which the piston is capable of bearing in axial direction and is sealable by means of a sealing ring.

Owing to this further development, the testing device is provided with an annular chamber which is separable from the inflation chamber and, similar to an annular chamber formed by a rim and a tire and to be filled with compressed gas, is closed at the end of the inflation process by controlled retraction of the inflation ring. As a result, the closing operation terminating the inflation process in which the tire bead moves into sealing engagement with the seating surface of the rim, can be reproduced by means of the testing device and checked and studied. It will be understood, of course, that in this modified embodiment the sensors are connected to the testing device in such a way as to detect exclusively or in addition the pressure and the temperature in the annular chamber formed between the outer wall and the annular wall.

According to the invention, the outer wall of the testing device may include a radially inwardly extending flange at the end remote from the bottom, which flange defines a second stop for the piston and against which the piston is able to bear additionally in axial direction when in abutment with a first stop. The second stop ensures that the relatively high forces acting on the piston when the annular chamber is filled with compressed gas can be absorbed. Any bending or clamping forces acting on the piston and liable to impair the axial movability of the piston are avoided in this manner.

According to another proposal of the invention, sealing of the testing device against the sealing device of the tire inflation device may be reliably effected by providing the bottom on its undersurface facing away from the inflation chamber with one or more annular beads suitable for engagement with the plate-shaped sealing device of the tire inflation device.

To effect a tight seal of the piston relative to the inflation ring, according to the invention the engagement surface of the piston may be provided with an elastomer pad.

To seal the piston against the first stop, the piston may be provided on the radially inner edge of the engagement surface with a first sealing ring arranged in an annular groove and suitable for sealing engagement with the first stop. Preferably, in the interest of ensuring a uniform support of the piston on the first and second stop, a second sealing ring engageable with the second stop is arranged in another annular groove provided on the radially outer edge of the engagement surface.

Ease of movement of the piston relative to the housing is achievable according to the invention by a spherical envelope surface cooperating with the cylindrical inner surface. This enables the piston to align itself on the inflation ring without the risk of constraining forces occurring.

DESCRIPTION OF THE DRAWING

A preferred embodiment of the present invention will be described in more detail the following with reference to the accompanying drawing.

The drawing shows a cross-section through a testing device 1 arranged between a plate-shaped sealing device 2 and an inflation ring 3 of a known tire inflation device not shown in greater detail. The inflation ring 3 is part of an inflation bell 4 movable along an axis A by driving means. The inner chamber 5 of the inflation bell 4 is connectible, via pressure lines and valves of a control device, to a source of compressed air or to atmosphere. For the mode of operation and further features of the tire inflation device, reference is made to patent specification EP 1 125 772 B1 contents of which are hereby incorporated herein by reference.

The testing device 1 has an annular housing 10 composed of a bottom 11, a cylindrical outer wall 12 and a likewise cylindrical annular wall 13. Both walls 12, 13 are attached to the bottom 11 by means of screws and sealed by suitable sealing means. The annular wall 13 has an outer diameter smaller than the inner diameter of the outer wall 12 and is arranged concentrically with the outer wall 12 and the axis A. The bottom 11 has on its undersurface two annular beads 14 enabling it to take support upon the sealing device 2 in pressure-tight manner.

Arranged in the inner chamber provided between the outer wall 12 and the annular wall 13 is an annular piston 15 which is guided for movement along a cylindrical inner surface 16 of the outer wall 12 and is sealed by means of a sealing ring 17. The envelope surface of the piston 15 is spherically shaped to avoid constrained forces. The piston 15 has a central piston opening 19 through which the annular wall 13 extends. The inner diameter of the piston opening 19 is greater than the outer diameter of the annular wall 13 to enable compressed air to be fed from the inflation bell 4 through the piston opening 19 into the inner chamber 18 between the piston 15 and the bottom 11 to fill the chamber.

The end surface of the piston 15 on the side remote from the bottom 11 forms an annular engagement surface 20 for the sealing edge of the inflation ring 3. For an improved sealing effect between the inflation ring 3 and the piston 15, the engagement surface 20 of the piston 15 includes a pad 21 of an elastomeric material which resides in an annular groove in the end surface. Arranged radially within and radially without the pad 21 are sealing rings 22, 23 seated in annular grooves in the end surface of the piston 15.

The annular wall 13 has at its end opposite the bottom 11 a radially outwardly extending flange 24 of an outer diameter greater than the piston opening and lying opposite the radially inner edge area of the end surface of the piston 15 and the sealing ring 22 arranged there. The flange defines a first stop for the piston 15 and limits the axial movement of the piston 15 in outward direction. At its end facing away from the bottom 11, the outer wall 12 is provided with a radially inwardly extending flange 25 arranged opposite the radially outer edge area of the end surface of the piston 15 and the sealing ring 23 and defining a second stop for the piston 15. The two flanges 24, 25 are arranged in such a way that the piston 15 abuts both stops essentially at the same time and in the stop position bears against both flanges 24, 25 essentially uniformly.

The flanges 24, 25 are radially spaced from each other by a distance corresponding essentially to the width of the engagement surface 20. The clearance space thereby obtained enables the inflation ring 3 to enter the annular chamber between the flanges 24, 25 and the outer wall 12 and the annular wall 13 in order to make engagement with the engagement surface 20 of the piston 15. The outer diameter of the flange 24 is dimensioned smaller than the inner diameter of the inflation ring 3, thereby causing an annular gap to be produced between the flange 24 and the inflation ring 3 through which compressed air is allowed to flow from the inflation bell 4 into the inner chamber 18 between the annular wall 13 and the outer wall 12 when the piston 15 is unseated from the flanges 24, 25.

Interposed between the piston 15 and the bottom 11 in the inner chamber 18 and equally spaced apart from each other are several springs 26. The springs 26 are dimensioned sufficiently strong to urge the piston 15 in the stop position against the flanges 24, 25 with a defined force. The springs 26 are guided on pins 27 secured to the bottom 11 and combining with their free ends to form a stop for the piston 15. The pressure in the inner chamber 18 is measured by a pressure sensor 28, and the temperature of the housing is measured by a temperature sensor 29. Both sensors are arranged on the outer wall 12, their measured values being readable as electric voltages at terminals 30, 31. Further connected to the inner chamber 18 is a vent valve 32 through which the inner chamber 18 is connectible to atmosphere.

To test a tire inflation device, instead of using an arrangement comprised of wheel rim and tire, the testing device 1 is positioned on the sealing device 2 of the tire inflation device and located centrally to the axis A. Central location is facilitated by an annular collar 33 engaging in a central bore 34 in the sealing device 2. The terminals 30, 31 are connected to an evaluating device for evaluating the voltages produced by the sensors 28, 29. After the tire inflation device is started, it lowers the tire inflation bell 4 under program control as a result of which the inflation ring 3 with its sealing edge makes engagement with the pad 21 of the piston 15 following which it enters the inner chamber 18 while moving the piston 15 against the force of the springs 26 in the direction of the bottom 11. In entered position, the inflation bell 4 encloses, in conjunction with the piston 15, the outer wall 12, the bottom 11 and the sealing device 2, an inflation chamber 35 which also communicates with the inner chamber 18 via the annular gap present between the inflation ring 3 and the flange 24 and the piston opening 19. Via controllable supply lines on the inflation bell 4, air or gas under pressure can then be fed to the inflation chamber 35 and the inner chamber 18, including the possibility for pressure increase and temperature being measured and recorded by means of the sensors 28, 29.

When a predetermined inflation pressure measured by the measuring device of the tire inflation device is reached, the inflation bell 4 is lifted until the piston 15 with the sealing ring 22 abuts the flange 24, thereby separating the inner chamber 18 from the inflation chamber 35. The inflation ring 3 remains in contact with the pad 21, maintaining the inflation chamber 35 closed. The pressure in the inflation chamber 35 can then be lowered to atmospheric under control. The inflation bell 4 then travels farther upwards, causing the inflation ring 3 to be lifted clear of the pad 21 of the piston 15 and to be removed from the clearance space between the flanges 24, 25.

In the inner chamber 18 sealed tight by the piston 15 the inflation pressure is maintained. By means of the vent valve 32 connected to the inner chamber 18 it is possible to vent the inner chamber 18 of the testing device 1 independently of the inflation device. Alternatively, it is also possible to vent the inner chamber 18 by means of the inflation device, which is accomplished by lowering the inflation bell 4 again prior to decreasing the pressure in the inflation chamber 35 whereby the piston 15 with the sealing ring 22 is unseated from the flange 24 and the inner chamber 18 is again connected to the inflation chamber 35.

What is claimed is:

1. A testing device for a tire inflation device having an inflation ring which is engageable against a sidewall of a tire and has an annular opening through which gas under pressure can be fed to the tire, and a sealing device arranged opposite the inflation ring, comprising
    a housing which includes a bottom and an annular outer wall with a cylindrical inner surface bounding an inflation chamber,
    a piston which is movably guided on the cylindrical inner surface, is sealed and has on the side facing away from the bottom an annular engagement surface for sealingly engaging the inflation ring and radially within the engagement surface has a piston opening leading into the housing, at least one spring arranged between the bottom of the housing and the piston, its spring force seeking to move the piston away from the bottom,
    and a pressure sensor capable of detecting the pressure in an inner chamber of the housing adapted to be filled with compressed gas and converting the pressure into electrical quantities.

2. The testing device according to claim 1, wherein an annular wall is affixed to the bottom of the housing said wall having a diameter smaller than the outer wall and extending through the centrally arranged piston opening, with the annular wall including at its end remote from the bottom a radially outwardly extending flange forming a first stop for the piston, said piston being adapted to be urged against the first stop by the force of the spring and being sealable on the first stop by means of a first sealing ring.

3. The testing device according to claim 1, wherein the outer wall includes at the end remote from the bottom a radially inwardly extending flange which defines a second stop for the piston and against which said piston is able to bear in axial direction.

4. The testing device according to claim 1, wherein a temperature sensor for measuring the wall temperature is arranged on the outer wall.

5. The testing device according to claim 1, wherein the bottom has on its undersurface facing away from the inflation chamber at least one annular bead for effecting a seal on the sealing device of the tire inflation device.

6. The testing device according to claim 1, wherein the engagement surface of the piston is provided with an elastomer pad.

7. The testing device according to claim 2, wherein the piston includes radially inside the engagement surface an annular groove accommodating the first sealing ring engageable with the first stop.

8. The testing device according to claim 3, wherein the piston includes radially outside the engagement surface a second sealing ring arranged in an annular groove and engageable with the second stop.

9. The testing device according to claim 1, wherein the piston has a spherical envelope surface cooperating with the cylindrical inner surface.

10. The testing device according to claim 1, wherein a vent valve by means of which the inner chamber is connectible to atmosphere is connected to the inner chamber.

* * * * *